United States Patent
Strongin et al.

(10) Patent No.: US 6,559,850 B1
(45) Date of Patent: May 6, 2003

(54) METHOD AND SYSTEM FOR IMPROVED MEMORY ACCESS IN ACCELERATED GRAPHICS PORT SYSTEMS

(75) Inventors: Geoffrey S. Strongin, Austin, TX (US); Qadeer A. Qureshi, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/183,205

(22) Filed: Oct. 30, 1998

(51) Int. Cl.$^7$ .............................. G06F 13/14; G09G 5/39
(52) U.S. Cl. .................. 345/520; 345/531; 710/306; 710/310
(58) Field of Search ................................ 345/501, 503, 345/520, 531, 533, 534, 535, 541, 556; 710/306, 310

(56) References Cited

U.S. PATENT DOCUMENTS

| | | | | |
|---|---|---|---|---|
| 5,822,772 A | * | 10/1998 | Chan et al. ................. | 711/158 |
| 5,911,051 A | * | 6/1999 | Carson et al. ............... | 710/107 |
| 5,974,571 A | * | 10/1999 | Riesenman et al. ............ | 714/47 |
| 5,991,855 A | * | 11/1999 | Jeddeloh et al. .............. | 711/146 |
| 5,999,183 A | * | 12/1999 | Kilgariff et al. ............. | 345/418 |
| 6,012,118 A | * | 1/2000 | Jayakumar et al. ........... | 710/126 |
| 6,047,334 A | * | 4/2000 | Langendorf et al. .......... | 709/103 |
| 6,088,772 A | * | 7/2000 | Harriman et al. ............ | 711/158 |
| 6,092,158 A | * | 7/2000 | Harriman et al. ............ | 710/240 |
| 6,173,369 B1 | * | 1/2001 | Nguyen et al. .............. | 711/140 |
| 6,173,378 B1 | * | 1/2001 | Rozario et al. .......... | 365/230.05 |
| 6,202,101 B1 | * | 3/2001 | Chin et al. ..................... | 710/5 |

OTHER PUBLICATIONS

Intel Corporation, *Accelerated Graphics Port Interface Specification*, Revision 1.0 (Jul. 31, 1996).

* cited by examiner

Primary Examiner—Ulka J. Chauhan
(74) Attorney, Agent, or Firm—Meyertons, Hood, Kivlin, Kowert, & Goetzel, P.C.; B. Noël Kivlin

(57) ABSTRACT

A method and system for improving memory access in Accelerated Graphics Port systems. The method and system associate a transaction id with individual data transactions within a number of Accelerated Graphics Port (AGP) pipelined data transactions, and identify the individual data transactions within the number of AGP pipelined data transactions via the transaction id. In one instance, the association of a transaction id with individual data transactions includes but is not limited to associating a transaction id with each individual memory read request within a number of AGP pipelined memory read requests and associating an identical transaction id with each individual data unit, within a number of pipelined data units, corresponding to each individual memory read request within the number of AGP pipelined memory requests. In another instance, the association of a transaction id with individual memory read requests within a number of AGP pipelined memory read requests includes but is not limited to placing a transaction id on a Side Band Addressing bus substantially immediately after placing a read request on the same Side Band Addressing bus, and the association of an identical transaction id with individual data units within a number of the data units associated with pipelined data units corresponding to each of the AGP pipelined memory read requests includes but is not limited to placing a transaction id on a ST[2::0] bus while substantially simultaneously placing a data unit on an AGP Interconnect.

35 Claims, 8 Drawing Sheets

METHOD AND SYSTEM FOR IMPROVED MEMORY ACCESS IN ACCELERATED GRAPHICS PORT SYSTEMS

BACKGROUND OF THE INVENTION

1. Field of the Invention

The present invention relates, in general, to a method and system to be utilized in data processing systems. In particular, the present invention relates to a method and system to be utilized in, for non-limiting example, data processing systems wherein the Accelerated Graphics Port (AGP) interface standard is utilized.

2. Description of the Related Art

Data processing systems are systems that manipulate, process, and store data and are notorious within the art. Personal computer systems, and their associated subsystems, constitute well known species of data processing systems. Personal computer systems in general and IBM compatible personal computer systems in particular have attained widespread use for providing computer power to many segments of today's modem society. A personal computer system can usually be defined as a desk top, floor standing, or portable microcomputer that includes a system unit including but not limited to a system processor and associated volatile and non-volatile memory, a display device, a keyboard, one or more diskette drives, one or more fixed disk storage devices, and one or more data buses for communications between devices. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

A computer system or data-processing system typically includes a system bus. Attached to the system bus are various devices that may communicate locally with each other over the system bus. For example, a typical computer system includes a system bus to which a central processing unit (CPU) is attached and over which the CPU communicates directly with a system memory that is also attached to the system bus.

In addition, the computer system may include a peripheral bus for connecting certain highly integrated peripheral components to the CPU. One such peripheral bus is known as the Peripheral Component Interconnect (PCI) bus. Under the PCI bus standard, peripheral components can directly connect to a PCI bus without the need for glue logic. Thus, PCI is designed to provide a bus standard on which high-performance peripheral devices, such as graphics devices and hard disk drives, can be coupled to the CPU, thereby permitting these high-performance peripheral devices to avoid the general access latency and the band-width constraints that would have occurred if these peripheral devices were connected to a low speed peripheral bus. Details on the PCI local bus standard can be obtained under the PCI Bus Specification, Revision 2.1, from the PCI Special Interest Group, which is hereby incorporated by reference in its entirety.

Relatively recently, techniques for rendering three-dimensional (3D) continuous-animation graphics have been implemented within PCs which, as will be explained below, have exposed limitations in the originally high performance of the PCI bus. The AGP interface standard has been developed to both (1) reduce the load on the PCI bus systems, and (2) extend the capabilities of systems to include the ability to provide 3D continuous-animation graphics with a level of quality previously found only on high-end computer workstations. The AGP interface standard is defined by the following document: Intel Corporation, Accelerated Graphics Port Interface Specification, Revision 1.0 (Jul. 31, 1996), which is hereby incorporated by reference in its entirety.

The AGP interface standard is specifically targeted to improve the efficiency of 3D continuous-animation graphics applications which utilize a technique know in the art as "texturing." Consequently, as background for understanding the data processing systems utilizing the AGP interface standard, it is helpful to have a brief overview of the data processing needs of 3D continuous animation graphics applications which utilize texturing, how they degrade the performance of PCI local bus systems, and how the AGP interface standard remedy this degradation of performance.

The display device of a computing system displays data in two-dimensions (2D). In order to create a 3D continuous animation graphical display, it is first necessary to create an object such that when the object is presented on the 2D display device, the object will be perceived by a human viewer as a 3D object. There are two basic ways in which this can be done. The first way is to use color and shading techniques to trick the human visual system into perceiving 3D objects on the 2D display device (essentially the same technique used by human artists when creating what appear to be 3D landscapes consisting of trees, rocks, streams, etc., on 2D canvases). This is a very powerful technique and creates superior 3D realism. The second way is to use mutually perpendicular lines (e.g., the well-known x, y, z coordinate system) to create geometric objects which will be interpreted by the human visual system as denoting 3D (essentially the same technique used by human architects to create the illusion of 3D in perspective view architectural drawings). However, the 3D illusion created by the use of mutually perpendicular lines is generally perceived to be inferior to that produced by the coloring and shading techniques.

Subsequent to creating a 3D object, the object must be animated. Animation is the creation of the illusion of continuous motion by the rapid sequential presentation of discrete images, or frames, upon the 2D display device. Animated 3D computer graphics are generated by taking advantage of a well know physiological property of the human visual system which is that if a person is shown a sequence of 15 discrete snapshots of a continuous motion, where each snapshot was taken in $\frac{1}{15}$ second intervals, within one second, the brain will integrate the sequence together such that the person will "see," or perceive, continuous motion. However, due to person-to-person variations in physiology, it has been found empirically that a presentation of 20 images per second is generally the minimum rate at which the majority of people will perceive continuous motion without flicker, with 30 images per second tending to be the accepted as the optimal presentation speed.

The difficulty with 3D continuous animation computer graphics is that while the color and shading techniques (which are typically accomplished via bit-mapped images) produce superior 3D realism, such techniques are not easy for a computer to translate through geometric space for the creation of continuously varying sequential images necessary to produce the animation effect. On the other hand, the geometric shapes produced via the use of mutually perpendicular lines allow for easy computer manipulation in three dimensions, which allows the creation of sequential images necessary to produce the animation effect, but such geometric shapes result in inferior 3D realism. Recent 3D continuous-animation computer graphics techniques take advantage of both of the foregoing noted 3D techniques via the use of a middle ground approach known in the art "texturing."

In the use of texturing, the gross, overall structures of an object are denoted by a 3D geometric shape which is used to do geometric translation in three space, while the finer details of each side of the 3D object are denoted by bit mapped images (known in the art as "textures") which accomplish the color and shading techniques. Each time a new image of an object is needed for animation, the geometric representation is pulled from computer memory into a CPU, and the appropriate translations calculated. Thereafter, the translated geometric representation is cached and the appropriate bit-mapped images are pulled from computer memory into the CPU and transformed as appropriate to the new geometric translations so as to give the correct appearance from the viewpoint of the display device, the new geometric position, and any lighting sources and/or other objects that may be present within the image to be presented. Thereafter, a device known as the graphics controller, which is responsible for creating and presenting frames (one complete computer screen) of data, retrieves both the translated geometric object data and transformed texture data, "paints" the surfaces of the geometric object with the texture data, and places the resultant object into frame buffer memory (a storage device local to the graphics controller wherein each individual frame is built before it is sent to the 2D display device). It is to be understood that the foregoing noted series of translations/transformations is done for each animated object to be displayed.

It is primarily the technique of texturing which has exposed the performance limitations of PCI bus systems. It has been found that when an attempt is made to implement 3D continuous-animation computer graphics application wherein texturing is utilized within PCI bus systems, the texturing data results in effective monopolization of the PCI bus by the application, unless expensive memory is added to the graphics controller. That is, texturing using the PCI bus is possible. However, due to PCI bandwidth limitations, the textures must fit into the memory directly connected to the graphics card. Since there is a direct correlation between the size of textures and the realism of the scene, quality can only be achieved by adding memory to the graphics card/controller. It was this realization that prompted the development of the AGP interface specification: with the AGP interface standard, texture size can be increased using available system memory. The AGP interface standard is intended to remedy the exposed limitations of the PCI local bus systems by providing extended capabilities to PCI bus systems for performing 3D continuous-animation computer graphics, as will become clear in the following detailed description.

The AGP interface standard accomplishes the foregoing via a rather indirect process. Under the AGP interface standard, a CPU independently processes the geometric and texturing data associated with each object to be displayed in a scene. Subsequent to processing the geometric and texturing data, the CPU writes the geometric and texturing data back into system memory. Thereafter, the CPU informs a graphics processor that the information is ready, and the graphics processor retrieves the information from the system memory.

As can be seen from the foregoing, most of the traffic on the AGP bus is actually generated by the graphics controller. That is, under the dictates of the AGP interface standard, the graphics controller is typically either reading data from system memory or writing data to system memory. One of the main thrusts of the AGP interface standard is to create an AGP bus (alternatively referred to as the AGP Interconnect) which substantially optimizes transactions generated by the graphics controller, such that high rates of data throughput are provided.

One of the features supported by the AGP interface specification is that the graphics controller, when it is reading data from memory, be able to issue what are known as "pipeline cycles." By "pipeline cycles" what is meant is that the graphics controller can issue a first memory access request, and before that first request is completed can issue a second memory access request, and before either the first or second request is completed can issue a third memory access request, etc. The AGP interface standard itself does not limit the number of pipelined requests that can be issued before completion. It is actually up to the hardware, for example an AGP graphics controller communicating with an AGP-enabled Northbridge, to negotiate what is the acceptable depth (i.e., how many transactions can be issued outstanding) of the pipeline.

It is significant that while the AGP specification does allow pipelining of memory accesses, it does not allow the transactions to be completed out of order. In other words, if a graphics controller issues four memory transactions A, B, C, and D, under the AGP interface standard the graphics controller can issue all of them without any one of them being completed. However, also under the dictates of the AGP interface specification, the requested memory transactions must complete in the same order as they were issued. This requirement of in-order completion gives rise to at east two inefficiencies: an increase in data latency and a requirement that the memory controller, located in the AGP-enabled Northbridge, work extra hard to keep things in order as required by the AGP interface standard.

As an aid to understanding these noted inefficiencies, it is helpful to have some background on the way in which memory access typically works. Typically, a computer system memory is a collection of Direct Random Access Memory units (DRAMs). The computer system memory, composed of DRAMs, can store data, but there is typically no intelligence in the system memory. The intelligence concerning how data is going to be stored, where the data is going to be stored, how the data is going to be read or written, etc., is contained within a module known within the art as a "memory controller" which may be contained within some other system component, typically a Northbridge.

The memory controller controls access to system memory, which as has been noted is typically composed of DRAMs. A DRAM can be thought of as a collection of cells, or storage locations, wherein data is stored. For simplicity it will be assumed here that each cell stores a byte, but those skilled in the art will recognize that other storage sizes are possible.

When a memory access, such as a read cycle, is engaged in, the memory controller is given an address by another device, such as a graphics controller. That address needs to correctly specify one of the cells where data is actually stored. Ordinarily, cells within DRAMs are arranged in row and column format (i.e., the cells are arranged like a matrix).

Consequently, an address, which for sake of illustration will be assumed to be 16 bits long, customarily is conceived of as being composed of two parts: a first 8-bit portion of the address which is associated with a row address, and a second 8-bit portion which is associated with a column address (again, the bit lengths are hypothetical and merely utilized here for illustrative purposes). This fragmentation of the address into row and column portions allows the address to correctly specify a storage location, or cell, by its row and column.

Conventionally, a DRAM has at least two buses, or at least hypothetically what can be treated as two buses: a data bus, and an address bus. To minimize DRAM hardware, it is customary that the address bus be only eight bits wide, in order to minimize the number of pins on the DRAM, which those skilled in the art will recognize is a major constraint or limiting factor on how small one can make a DRAM chip. Due to this limitation on the width of the address bus, memory access is typically achieved by first placing the row portion of the address on the address bus, which will select the appropriate row, and second, a short time later, placing the column portion of the address on the address bus, which will select the appropriate column. This then correctly specifies the row and column location of the storage location that is desired. At some time after the row and column information have both been specified, the data from the memory location specified by the row and column address appears on the data bus.

From the foregoing, it can be seen that in order to make a single memory access there are three phases: a row address phase, a column address phase, and a data retrieval phase. In the past, it was noticed that typical programs tend to operate sequentially, so if there is a memory address accessed, it is likely that the next memory address accessed will be the very next cell, which means that the column address is likely to change, while the row address is not likely to change. Consequently, typical DRAMs are structured such that once the row address has been driven, thereafter the DRAM responds to new addresses on the address bus as if those addresses are column indicators, and thus will use such addresses as column addresses within a current row until the DRAM, is notified that a new row address will be appearing on the address bus. DRAM devices using this scheme (driving the row once and then operating upon columns with the row) are known in the art as "page mode" DRAMs.

In light of the foregoing, in the event that a memory controller has several memory accesses to be done sequentially, then once a page is open it makes sense from an efficiency standpoint to examine pending as well as current memory accesses in order to determine which of those pending memory accesses will be to memory locations that are within a currently open page (that is, the row of the request is the row from which a memory controller is currently reading within a DRAM). In other words, assuming a page X is open; if there are four memory accesses A, B, C, and D, waiting to be performed, and assuming the first access A is to page Z, the second access B is to page X, the third access C is to page Y, and the fourth access D is to page W, it is preferable from a memory efficiency standpoint that the data access (i.e., access B) appropriate to the page that is open (X) be made first.

Current memory controllers already "look ahead" to see if pending memory accesses are destined for currently open pages. Furthermore, at any given time, typically more than one page of memory is generally open. For example under the Direct RDRAM scheme (expected to be available in the near future), it is expected that up to 8 pages per RDRAM chip will be open simultaneously. Thus, if a system has eight RDRAM chips (a reasonable assumption), it will be possible to have up to 64 pages open simultaneously. Thus, when multiple memory accesses are to be sequentially executed, an efficient strategy which may be employed by the memory controller is that it selects which ones of the memory accesses to be executed are intended for pages which are already open, completes those accesses first, and subsequently proceeds with the memory accesses which will require opening new pages. This greatly increases memory efficiency However, it is noteworthy that the effect of the forgoing alteration of the order in which memory accesses are executed, from the standpoint of a device interacting with such a memory controller, is that the memory controller will be seen to be executing accesses in an order different than that from in which they were received by the memory controller. That is, the memory controller has re-ordered the accesses inside the memory controller, and will thus respond to such requests for access "out of order." In the current AGP interface standard the AGP Interconnect (or AGP bus) does not allow or provide for such reordering of memory accesses. This means that even if a memory controller is capable of taking advantage of open pages (which is likely to be the case in most modem systems), because of the limitations of the AGP Interconnect under the AGP interface standard, the memory controller will not be allowed to do the reordering. Furthermore, since a significant percentage of existing memory controllers already take advantage of open pages, what this AGP Interconnect requirement will often actually mean is that additional hardware will need to be added to extant memory controllers such that the memory accesses are returned on the AGP Interconnect in the order in which they were received.

Various users, such as graphics vendors, within the art would like to have the ability to utilize the ability of memory controllers to complete requests out of order. Such out of order completion is particularly attractive, especially in high-bandwidth graphics processing environments, because out of order access reduces the average data latency; that is, some of the accesses can be completed quicker, which means that the overall time spent on completing a series of memory accesses will be smaller, which means that an increase in the efficiency of the memory subsystem will be achieved.

However, as noted, under the AGP interface specification, such out of order completions are not provided for or allowed. It is undeniable that the AGP interface standard is highly useful and that AGP compliant devices are highly desirable. However, it is likewise clear that inefficiencies exist and arise from the AGP standard restricting the acceptable manner of completion of memory access requests to be in order completion. It is therefore apparent that a need exists in the art for a method and system which will substantially conform to the established AGP interface standards, yet also allow memory accesses to be completed by the memory controller in an order different from that it which they were received.

SUMMARY OF THE INVENTION

It has been discovered that a method and system can be produced which will substantially conform to the established AGP interface standards, yet also allow memory accesses to be completed by the memory controller in an order different from that in which they were received. The method and system especially allow for improving memory access in Accelerated Graphics Port systems, but the method and system are not limited to Accelerated Graphics Port systems.

The method and system associate a transaction id with individual data transactions within a number of Accelerated Graphics Port (AGP) pipelined data transactions, and identify the individual data transactions within the number of AGP pipelined data transactions via the transaction id. In one instance, the association of a transaction id with individual data transactions includes but is not limited to associating a transaction id with each individual memory read request within a number of AGP pipelined memory read requests and associating an identical transaction id with each individual data unit, within a number of pipelined data units, corresponding to each individual memory read request within the number of AGP pipelined memory requests. In another instance, the association of a transaction id with individual memory read requests within a number of AGP pipelined memory read requests includes but is not limited to placing a transaction id on a Side Band Addressing bus substantially immediately after placing a read request on the same Side Band Addressing bus, and the association of an identical transaction id with individual data units within a number of the data units associated with pipelined data units corresponding to each of the AGP pipelined memory read requests includes but is not limited to placing a transaction id on a ST[2::0] bus while substantially simultaneously placing a data unit on an AGP Interconnect.

The foregoing summary is illustrative and is intended to be in no way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative and should not be taken to be limiting.

Figure 1:
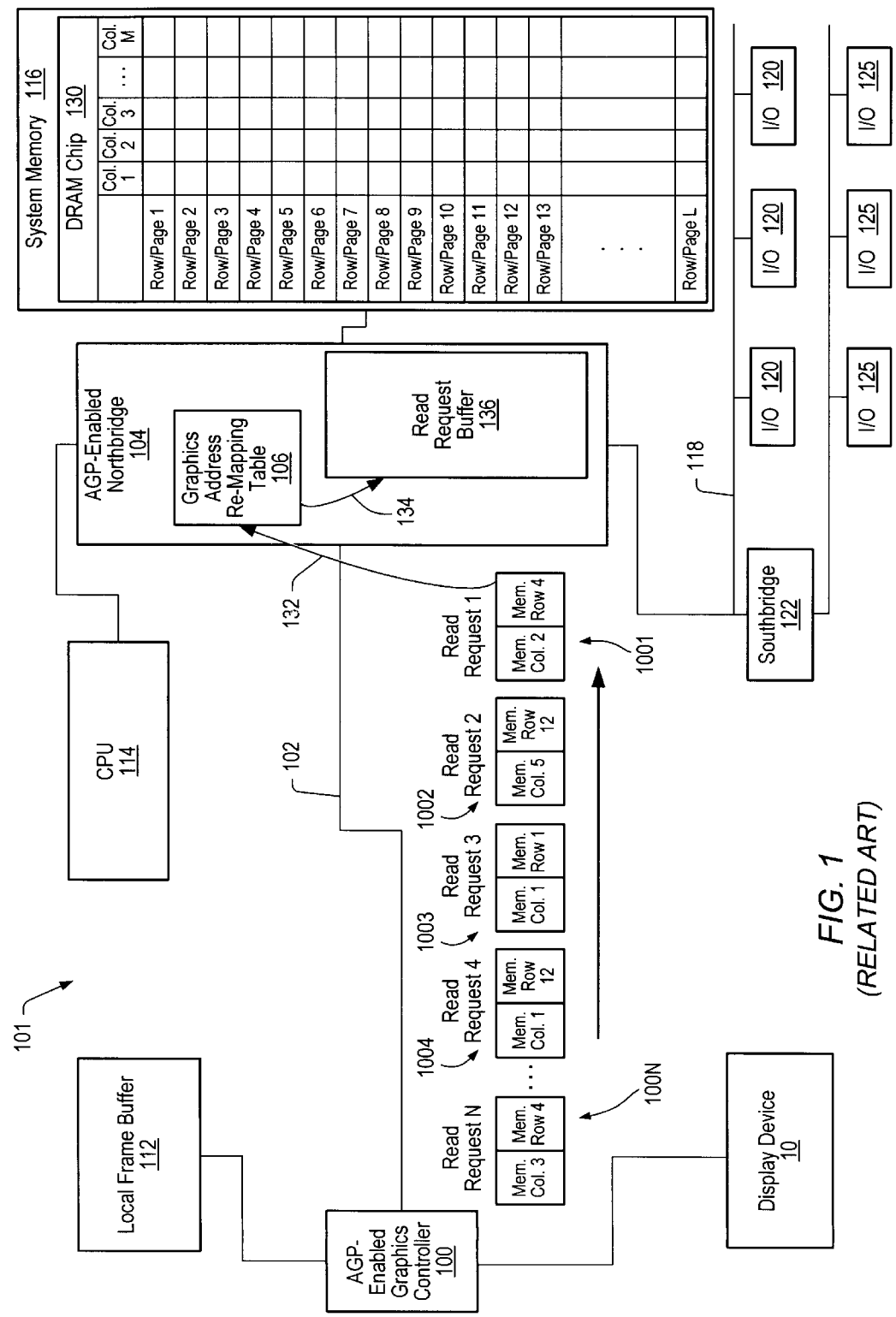
FIG. 1 shows a high-level component diagram depicting a related art AGP-enabled data processing system which forms an environment wherein one or more embodiments of the present invention may be practiced.

Referring now to FIG. 1, shown is a high-level component diagram depicting an AGP-enabled data processing system 101 which forms an environment wherein one or more embodiments of the present invention may be practiced. Shown are three building blocks of AGP: AGP-enabled graphics controller 100, AGP interconnect 102 (a data bus), and AGP-enabled Northbridge 104. Not shown, but deemed present is a fourth building block of AGP: an AGP-enabled operating system. The term AGP-enabled is intended to mean that the so-referenced components are engineered such that they interface and function under the standards defined within the AGP interface specification, referenced above. Further depicted are display device 110, local frame buffer 112, Central Processing Unit (CPU) 114, system memory 116, Peripheral Component Interconnect (PCI) bus 118, various Input-Output (I/O) devices 120, Southbridge 122, Industry Standard Architecture (ISA) bus 123, and various I/O devices 125.

Generally, each bus utilizes an independent set of protocols (or rules) to conduct data (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a system bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 104, in that it is to be understood that it translates and coordinates between the various data buses which communicate through AGP-enabled Northbridge 104.

It has been mentioned previously that under the AGP interface standard a graphics controller is free to issue pipelined requests for data. Shown is that AGP-enabled graphics controller issues N (where N is some positive integer) read requests 1001–100N to read data from a particular cell, or row and column location, from DRAM chip 130 in system memory 116 prior to any of the N−1 outstanding read requests 1001–100N being answered. It should be noted that although for conceptual clarity the read requests 1001–100N are shown in FIG. 1 as labeled requests 1–N, under the AGP standard there is no such labeling, and as will be shown below in FIG. 2, under the AGP standard such ordering is merely denoted by transmission order of the requests. Further illustrated is that within DRAM chip 116 each row can be conceptualized as a "page" in memory.

Those skilled in the art will recognize that the AGP interface standard allows AGP-enabled devices to treat AGP memory as if it were one contiguous whole, while in point of fact it may consist of several discontiguous regions of system memory. Accordingly, under the AGP-interface standard read requests 1001–100N to system memory first transit 132, 134 Graphics Address Re-mapping Table (GART) 106 prior to being loaded into read request buffer 136. Ordinarily, GART 106 re-maps the row and column AGP-memory addresses for which address is requested into row and column physical memory addresses. However, for sake of clarity of presentation and understanding, herein GART 106 will be treated as if it is transparent to the process. That is, while those skilled in the art will recognize that GART will typically re-map requested addresses, in the present detailed description GART 106 will be treated as if it merely passes the addresses through without re-mapping them so that the embodiments discussed herein can be more clearly understood.

Figure 2:
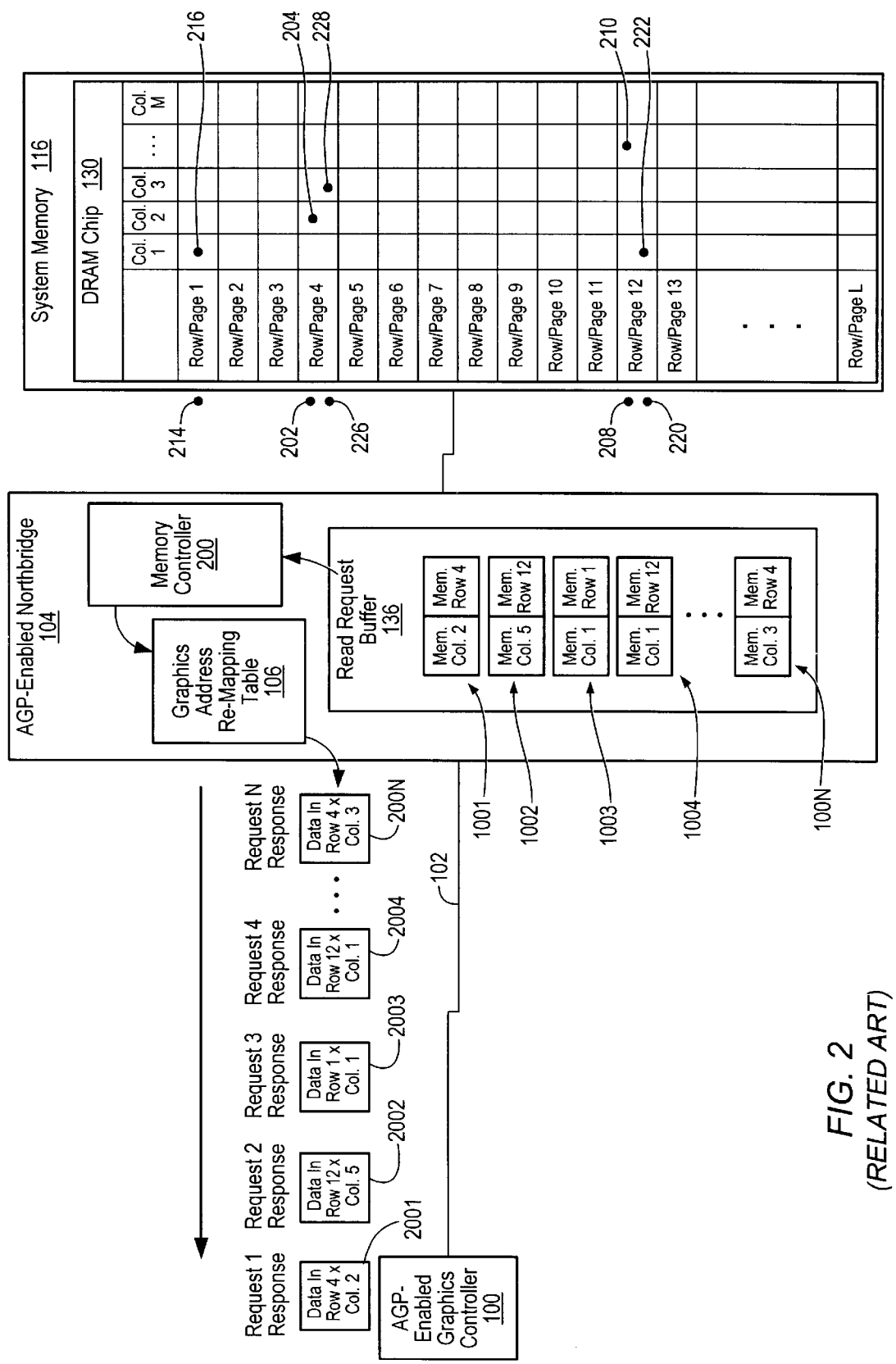
FIG. 2 depicts a high-level block diagram illustrating in broad overview how the AGP-enabled system of FIG. 1, which forms an environment wherein one or more embodiments of the present invention may be practiced, accesses memory and returns data from the memory locations specified by the N read requests illustrated in FIG. 1.

Referring now to FIG. 2, shown is a high-level block diagram illustrating in broad overview how the AGP-enabled system of FIG. 1, which forms an environment wherein one or more embodiments of the present invention may be practiced, accesses memory and returns data from the memory locations specified by the N read requests 1001–100N illustrated in FIG. 1. Shown are AGP-enabled graphics controller 100, AGP interconnect 102 (a data bus), and AGP-enabled Northbridge 104. The remaining shown components function substantially similar to the like-numbered components described in relation to FIG. 1.

Depicted in FIG. 2 is that GART 106 has loaded read requests 1001–100N into read request buffer 130 in the order in which they were received (for sake of illustration, read request buffer 130 is shown as a FIFO buffer). Shown is that, under the dictates of the AGP interface standard, memory controller 200 sequentially retrieves the read memory requests, accesses memory, and thereafter returns the data. Specifically, depicted is that in response to read request 1 1001, memory controller 200 first accesses 202 row 4 and thereafter accesses 204 column 2, from which data 206 is retrieved; in response to read request 2 1002, memory controller first accesses 208 row 12 and thereafter accesses 210 column 5, from which data 212 is retrieved; in response to read request 3 1003, memory controller first accesses 214 row 1 and thereafter accesses 216 column 1, from which data 218 is retrieved; in response to read request 4 1004, memory controller first accesses 220 row 12 and thereafter accesses 222 column 1, from which data 224 is retrieved; in response to read request N, memory controller first accesses 226 row 4 and thereafter accesses 228 column 3, from which data 230 is retrieved.

Illustrated is that data 2001 in response to request 1 1001, data unit 2002 in response to request 2 1002, data unit 2003 in response to request 3 1003, data unit 2004 in response to request 4 1004, and data unit 200N in response to request N 100N are returned in the order that the requests 1–N were received. Although for conceptual clarity, the data units returned are labeled as "Request 1 Response—Request N Response," such labeling is for conceptual clarity only and that under the AGP interface standard such labeling is not possible. That is, AGP graphics controller 100 which has previously issued read requests 1001–100N associates each data unit received with an outstanding read request solely on the order of receipt. That is, the first data unit 2001 received is assumed to be in response to read request 1 1001, the second data unit 2002 received is assumed to be in response to read request 2 1002, the third data unit 2003 received is assumed to be associated with read request 3 1003, etc.

The foregoing is why, as noted in the background discussion, the AGP interface standard requires that memory accesses be performed in order: the received order is the mechanism whereby AGP-enabled graphics controller 100 coordinates a received data unit with a particular read request. Thus, as has been illustrated, memory controller 200 must work to ensure that the read requests are serviced in the order received. Also, it will be recognized by those skilled in the art that, although memory controller 200 has been shown as accessing DRAM locations in the order received, the memory controller 200 could also rearrange the read requests such that advantage was taken of open pages, provided that sufficient logic was added to memory controller 200 such that the requests could re-order the retrieved data units into the order received. However, such reordering logic would result in increased complexity and decrease the efficiency associated with satisfying read requests out of order. Consequently, under the dictates of the AGP interface standard, additional strictures are placed upon memory controller 200, either in the requirement that memory controller 200 service read requests in order, or have logic which ensures that ultimately the requests are returned in the order received, even if as an intermediate step memory controller 200 services the requests out of order.

It has been discovered that it would be advantageous if systems operating under the AGP interface standard could be given the capability of taking advantage of the ability of memory controllers to service read requests out of order. In such a system, a transaction identification (transaction id) is associated both with each read request and with the data unit returned in response to each such read request.

Figure 3:
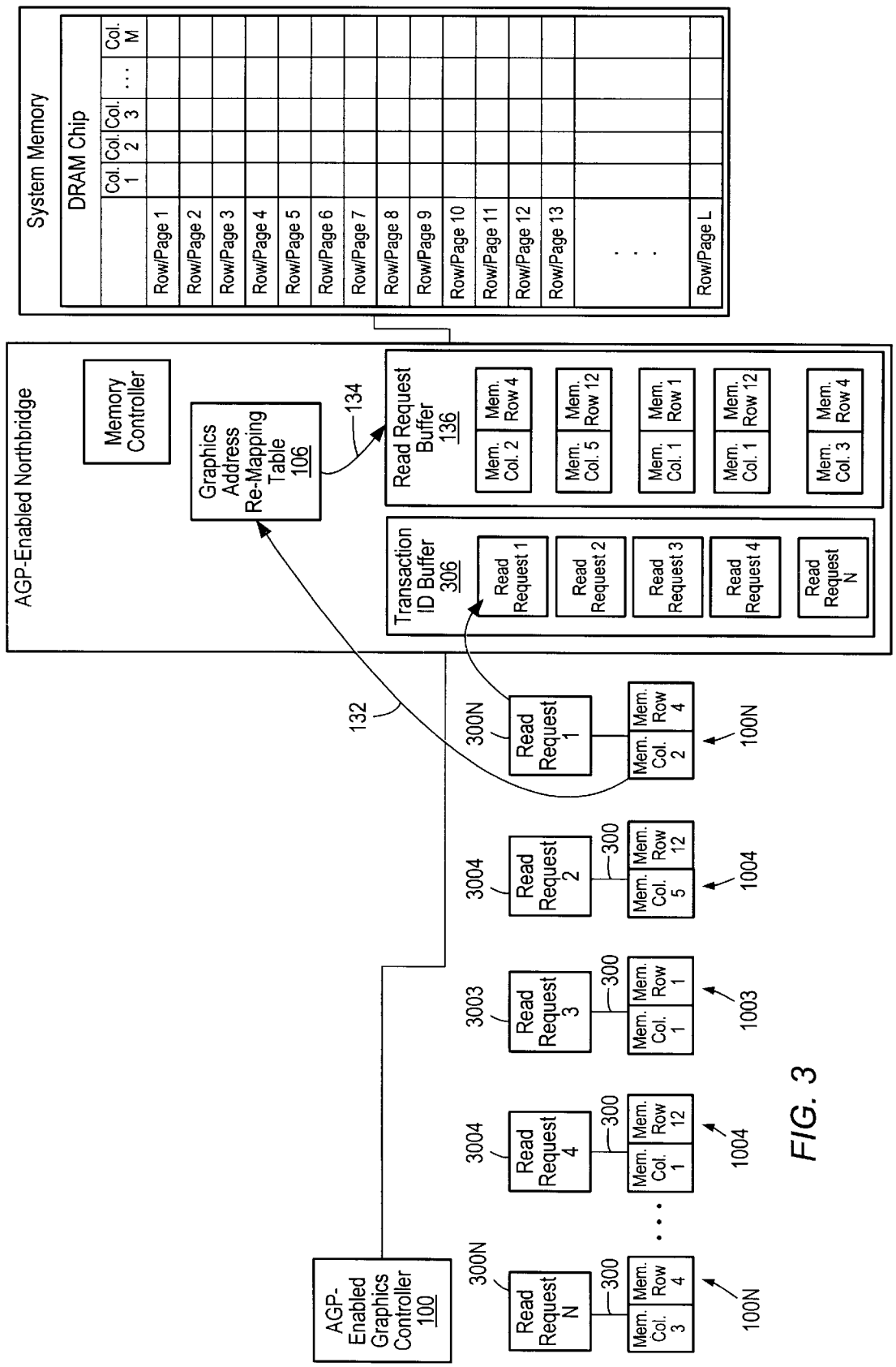
FIG. 3 illustrates a high-level pictographic representation of an embodiment of the present invention.

With reference now to FIG. 3, shown is a high-level pictographic representation of an embodiment of the present invention. Depicted is that each read request 1001–100N now has associated 300 with it transaction ID 3001–300N indicative of the relative orders of read requests 1001–100N. Shown is that each read request enters and is processed by GART 106 as is customary, while the transaction Ids 3000–300N are accepted separately into AGP-enabled Northbridge 104 and thereafter associated, via transaction id buffer 306, with their appropriate memory access in read request buffer 130.

Figure 4:
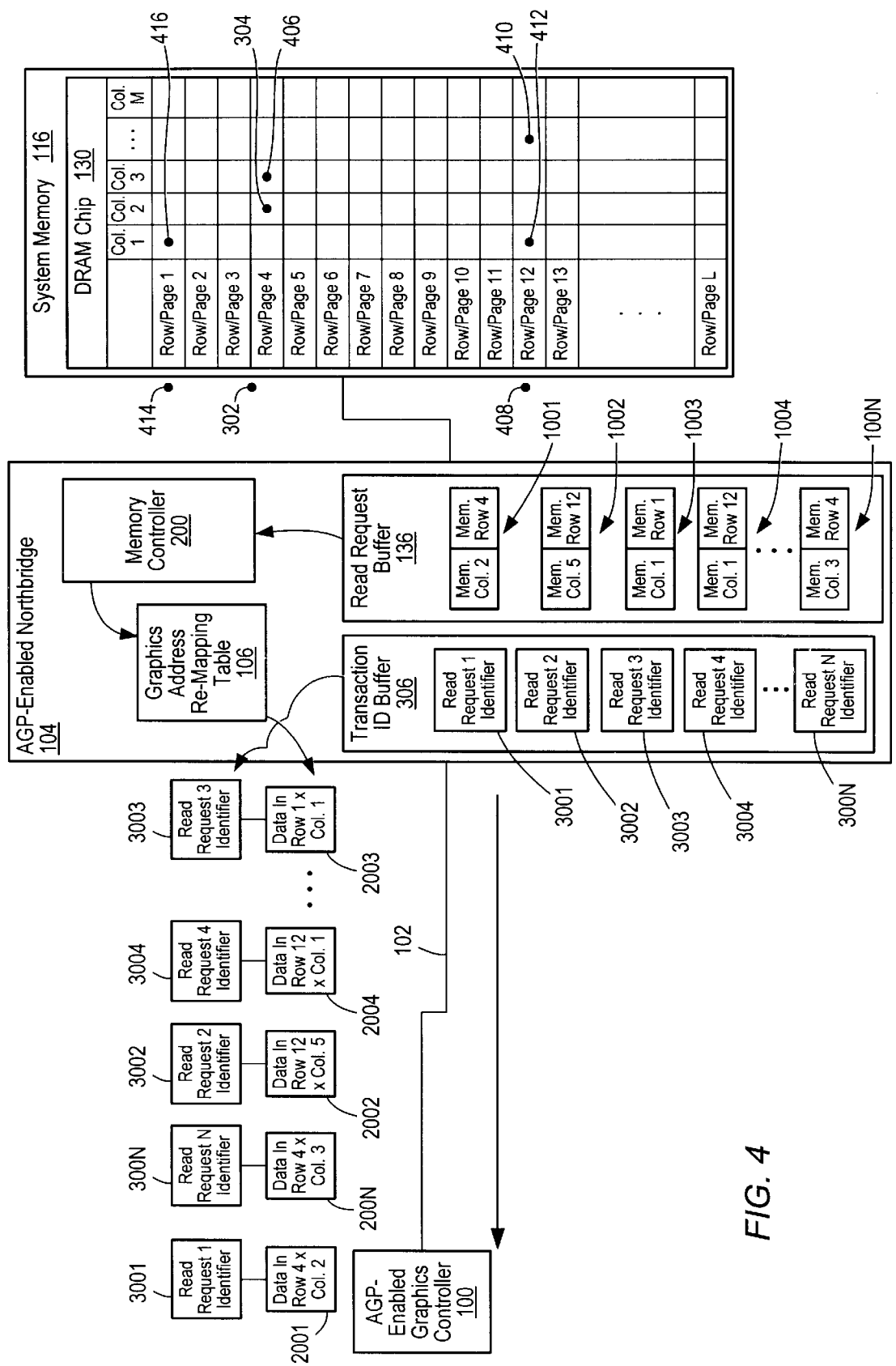
FIG. 4 shows that the transaction ids illustrated in FIG. 3 allow a memory controller to service read requests out of order, so that read requests to the same page (or row) of DRAM can be serviced together.

Referring now to FIG. 4, shown is the high-level pictographic embodiment of FIG. 3 wherein is depicted that transaction ids 3001–300N allow memory controller 200 to service read requests out of order, so that read requests to the same page (or row) of DRAM 130 can be serviced together. Shown in FIG. 4 is that the pending read requests are serviced out of order, each request being serviced utilizing the process just described, for more efficient data retrieval. Specifically, since read request N 100N is to row 4 of DRAM 130, transaction id N 300N and its associated data 200N are shown following read request 1 1001 and its associated data 2001, which means that read request N 100N was serviced immediately subsequent to read request 1 1001. Likewise, since read request 4 is to row 12, transaction id 4 3004 and its associated data 2004 are shown, following read request 2 and its associated data unit 2002, which means that read request 4 1004 was serviced immediately subsequent to read request 1 1002. Lastly, shown is that read request 3 was serviced last. Thus, the embodiment shown allows read requests to be satisfied out of order by use of transaction ids 3001–300N.

Also illustrated in FIG. 4 are the transaction savings allowed by the use of transaction ids 3001–300N. Specifically, depicted is that in response to read request 1 1001, memory controller 200 first accesses 302 row 4 and thereafter accesses 304 column 2, from which data 206 is retrieved; in response to read request N 100N, since memory controller has already accessed row 4, to satisfy read request N memory controller merely accesses 406 column 3, from which data 230 is retrieved; in response to read request 2 1002, memory controller first accesses 408 row 12 and thereafter accesses 410 column 5, from which data 212 is retrieved; in response to read request 4 1004, since memory controller 200 has already accessed 12, to satisfy read request 4 memory controller 200 merely accesses 412 column 1, from which data 224 is retrieved; in response to read request 3 1003, memory controller first accesses 414 row 1 and thereafter accesses 416 column 1, from which data 218 is retrieved. Thus, illustrated is that the use of transaction ids 3001–300N, even for the very limited case of 5 reads as shown in FIG. 4, has allowed the elimination of 2 row accesses from that shown in relation to FIG. 3. Thus, the embodiment of FIG. 4 can provide significant improvements in memory access.

Figure 5:
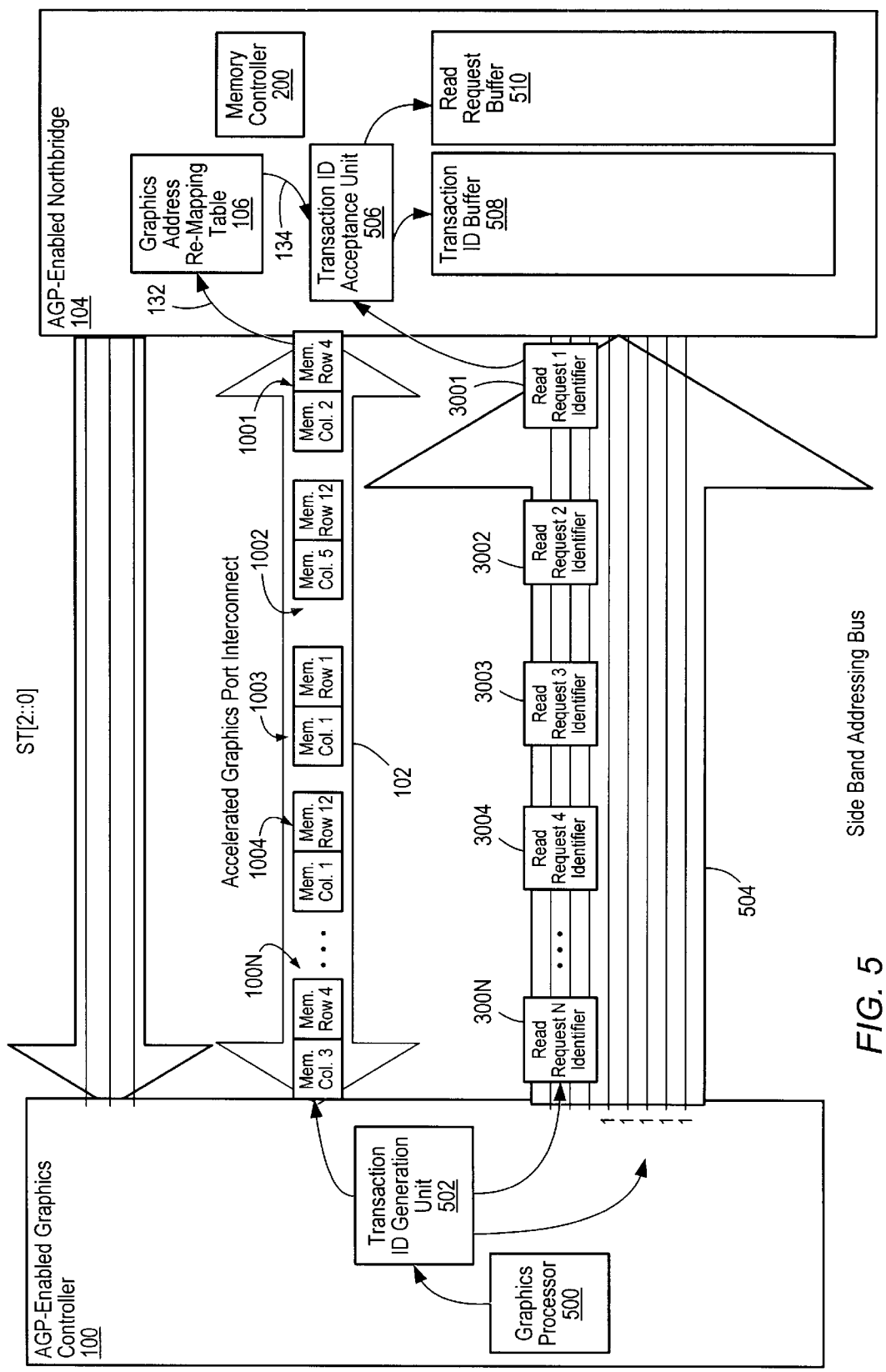
FIG. 5 depicts an embodiment of the present invention which utilizes AGP interface standard compliant hardware to provide transaction ids.

Referring now to FIG. 5, shown is an embodiment of the present invention which utilizes AGP interface standard compliant hardware to provide transaction ids 3001–300N. Depicted is that transaction Id generation unit 502 accepts memory requests generated by graphics processor 500; that is, graphics processor 500 operates as it would in the absence of transaction ids 3001–300N. Those skilled in the art will recognize that "to maximize efficiency and throughput on a random access memory bus such as AGP, the address is demultiplexed (separate address pins) from the data pins. The AGP interface provides an optional sideband signal to do this (SBA[7::0]), referred to as the sideband address port [or bus]. . . it is only an 8-bit wide interface . . . The sideband address port [or bus] is used exclusively to transmit AGP access requests. . . . In order to transmit the complete AGP access request across the 8-wire SBA port [or bus]), the request is broken into 3 parts: low order address bits and length, mid-order address bits and command, and high order address bits. These three parts are referred to as Type 1, Type 2, and Type 3, respectively. The registers for the last two parts (mid-order address bits (Type 2) and high order address bits (Type 3)) are 'sticky'. Where sticky refers to the attribute where they retain what was loaded into them, so these two parts of the request need only be transmitted if they have changed since the previous request." Accelerated Graphics Port Interface Specification, 13–14 Revision 1.0 (Jul. 31, 1996). That is, under the AGP interface specification, an AGP access request can consist of all three parts (Type 1, 2, and 3), or only one part (the low order address bits and length, or Type 1).

Illustrated is that, on the next clock edge subsequent to the transmission of an AGP access request (irrespective of whether the request consisted of all three parts or only the low order bits) transaction id generation unit 502 generates a transaction id associated with a received request, and places the transaction id on 3 of the lines of Side Band Addressing (SBA) Bus 504, while substantially simultaneously placing "11110" (in order to identify the information as a transaction id) on the remaining five lines of SBA Bus 504. Accordingly, shown is that substantially prior to placing each respective transaction id 3001–300N on SBA bus 504, transaction id generation unit 502 also places each read request 1001–100N with which the specific transaction id 3001–300N is associated on SBA bus 504. For example, read request 1 transaction id 3001 is placed on SBA bus 504 substantially immediately after read request 1 1001 is placed on SBA bus 504, read request 2 transaction id 3002 is placed on SBA bus 504 substantially immediately after read request 2 1002 is placed on SBA bus 504, read request 3 transaction id 3003 is placed on SBA bus 504 substantially immediately after read request 3 1003 is placed on SBA bus 504, and read request N transaction id 300N is placed on SBA bus 504 substantially immediately after read request 1 100N is placed on SBA bus 504. Notice that in this embodiment, since the transaction ids 3001–300N are to be denoted by the use of 3 data lines, or 3 bits, the greatest number of transactions ids that can be established is 8 ($2^3$), thus N=8 in this embodiment.

Depicted is that each read request 1001–100N is accepted and processed by GART 106 as is customary. Thereafter, each read request 1001–100N with re-mapped address (as has been discussed, for sake of clarity, GART 106 is being treated as a transparent mapping, and thus shown here is that the re-mapped addresses have the same addresses as read requests 1001–100N) is passed to transaction id acceptance unit 506. Illustrated is that transaction id acceptance unit 506 accepts each read request 1001–100N substantially simultaneously with accepting each read request transaction id 3001–300N. (Transaction id acceptance unit 506 is alerted to the presence of a transaction id on SBA bus 504 by the presence of all 1s on the upper 5lines of SBA bus 504.)

Shown is that transaction id acceptance unit 506 places each transaction id 3001–300N and correspondent read requests 1001–100N into transaction id buffer 508 and read request buffer 510, respectively, such that each transaction id 3001–300N is appropriately paired with each correspondent read request 1001–100N.

Figure 6:
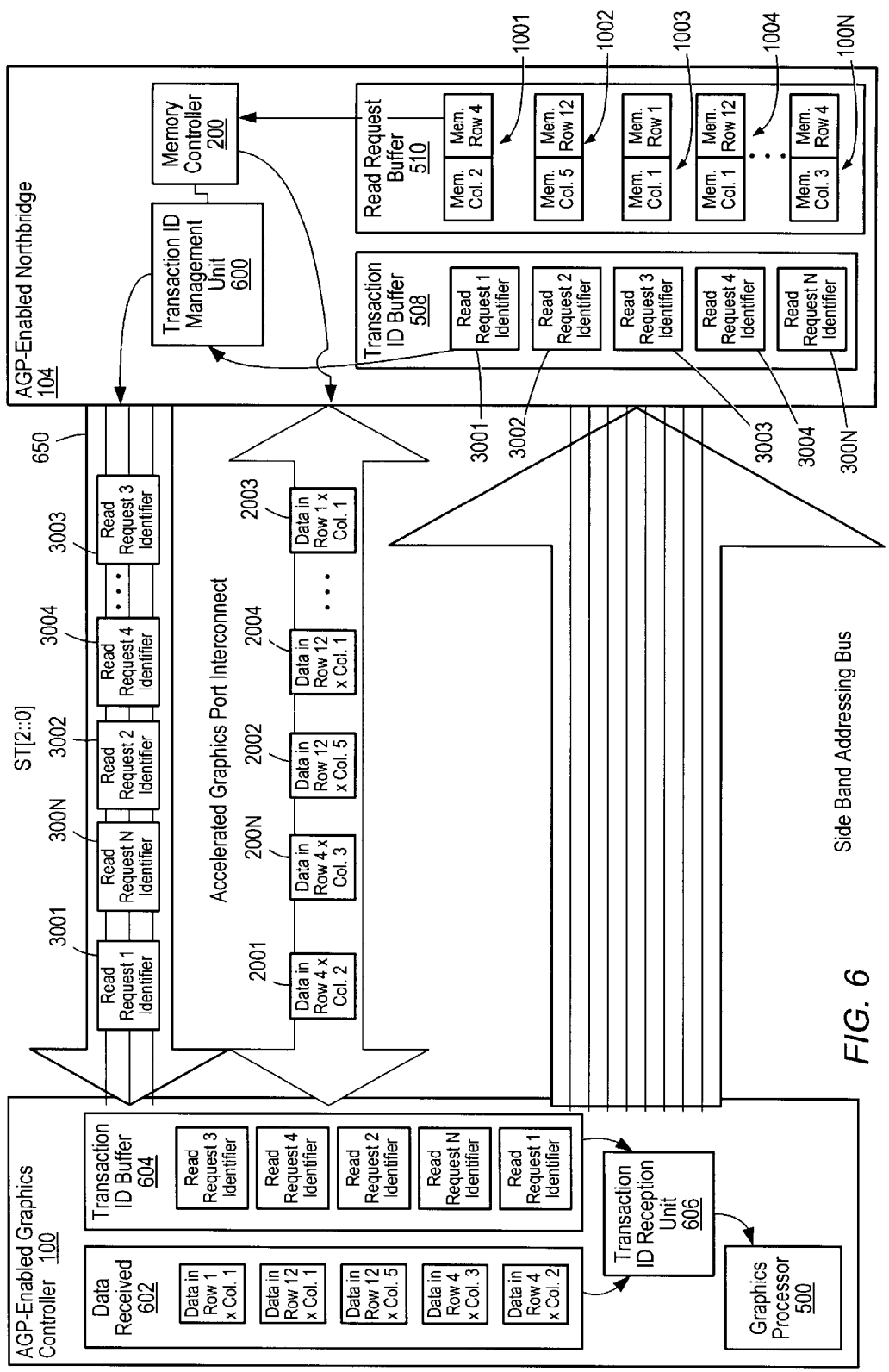
FIG. 6 illustrates both how the embodiment of FIG. 5 utilizes transaction ids to allow out of order memory access under the AGP interface standard and how transaction ids are provided in data transmission from an AGP-enabled Northbridge to an AGP-enabled graphics controller under the AGP interface standard.

With reference now to FIG. 6, shown is both how the embodiment of FIG. 5 utilizes transaction ids 3001–300N to allow out of order memory access under the AGP interface standard and how transaction ids 3001–300N are provided in data transmission from AGP-enabled Northbridge 104 to AGP-enabled graphics controller 100 under the AGP interface standard. Depicted is that transaction id management unit 600 is in communication with memory controller 200. When memory controller 200 decides to pull a read request (e.g., read request 1 1001) from read request buffer 510, substantially simultaneously transaction id management unit 600 pulls the associated transaction id (e.g., transaction id 1 3001) from transaction id buffer 508.

Although it was not explicitly noted above for sake of clarity of presentation, those skilled in the art will recognize that under the AGP interface specification, pipelined memory access requests can be directed to high priority or low priority queues. Consequently, when memory controller 200 returns data (e.g., data unit 206), in response to a read request, for transmission over AGP interconnect 102, under the AGP interface specification it is necessary to indicate whether the data returned is in response to a request originating in a high priority or a low priority queue. Under the AGP interface standard, this is accomplished by placing an appropriate code that indicates the cycle type and the data priority on ST[2::0] bus 650 (a 3 line bus defined under the AGP interface standard) on a clock edge prior to placing data on AGP interconnect 102. Accelerated Graphics Port Interface Specification, 30, 37, 40 Revision 1.0 (Jul. 31, 1996).

On the next clock edge following placement of the code indicating whether the data is in response to a read request originating in a high or low priority queue, transaction id management unit 600 places the associated transaction id (e.g., transaction id 1 3001) on ST[2::0] bus 650 (a 3 line bus defined under the AGP interface standard). AGP interconnect 102 is 32 bits wide, and since most responses to requests for data are in excess of 4 bytes (32 bits), the response to the requests will generally still be being transmitted over AGP interconnect 102 during that next clock edge. Consequently, the data (e.g., data unit 206) and its associated transaction id (e.g., transaction id 1 1001) will arrive at AGP enabled graphics controller 100 either at substantially the same time or slightly before the completion of the data sent in response to a request for data.

Depicted is that the received data unit (e.g., data unit 206) is stored in data received buffer 602 and its corresponding received transaction id (e.g., transaction id 1 3001) is stored in transaction id buffer 604. Subsequent to receipt, transaction id reception unit 606 receives each transaction id-data unit pair and ensures that the data units are delivered to graphics processor 500 in the manner they were transmitted.

Further shown in FIG. 6 is that the pending read requests are serviced out of order, each request being serviced utilizing the process just described, for more efficient data retrieval. Specifically, since read request N 100N is to row 4 of DRAM 130, transaction id N 300N and its associated data 200N are shown following read request 1 1001 and its associated data 2001, which means that read request N 100N was serviced immediately subsequent to read request 1 1001. Likewise, since read request 4 is to row 12, transaction id 4 3004 and its associated data 2004 are shown following read request 2 and its associated data unit 2002, which means that read request 4 1004 was serviced immediately subsequent to read request 1 1002. Thus, the embodiment shown allows read requests to be satisfied out of order.

Figure 7:
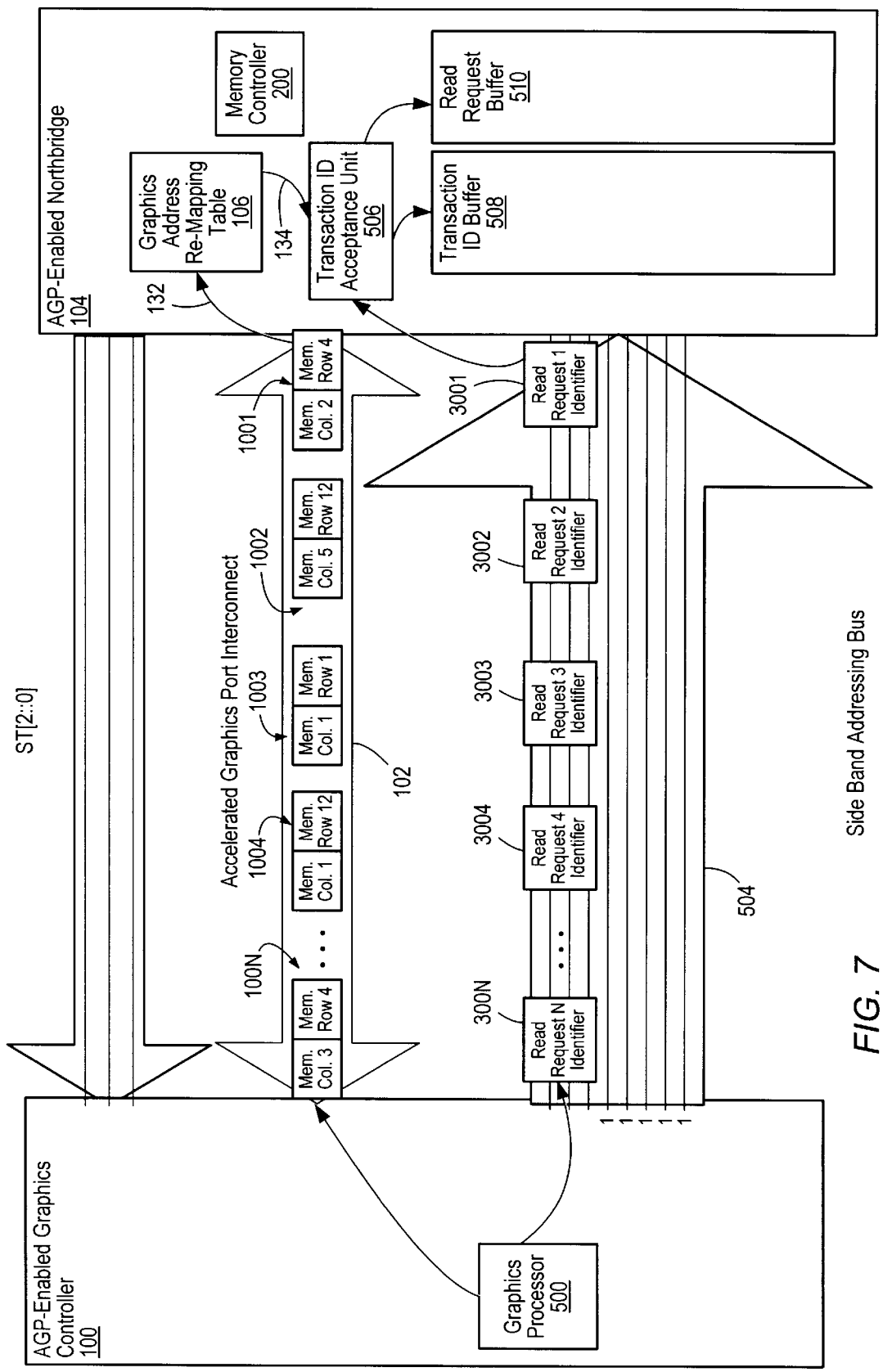
FIG. 7 and FIG. 8 show an embodiment substantially similar to the embodiment of FIGS. 5 and 6, except that shown is that a graphics processor is shown to have subsumed the functions described in relation to a transaction id generation unit and a transaction id reception unit such that the graphics controller itself now can generate, recognize, and handle transaction ids and their associated data units.
Figure 8:
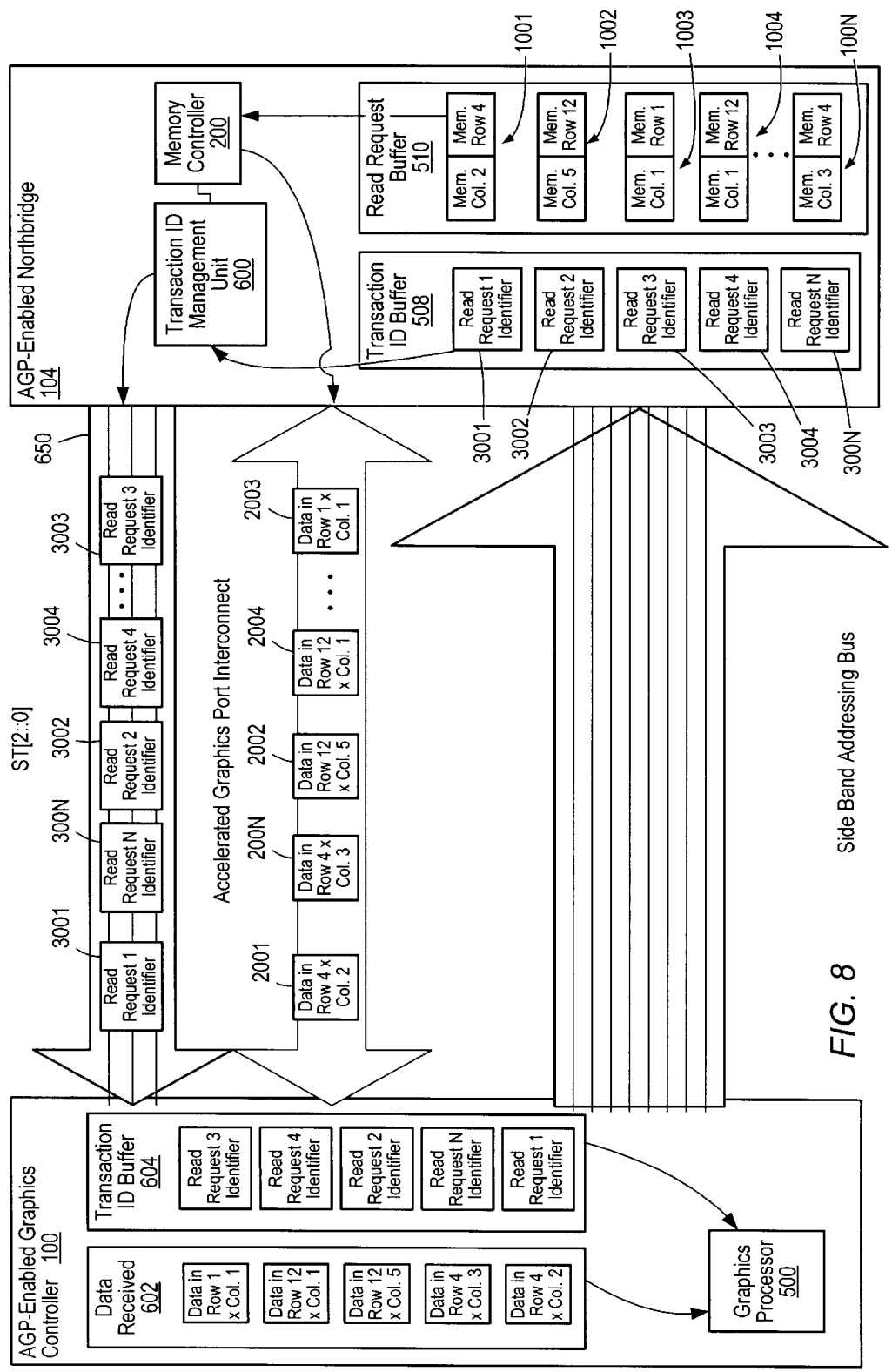

Referring now to FIGS. 7 and 8, shown is an embodiment substantially similar to the embodiment of FIGS. 5 and 6, except that shown is that graphics processor 700 has subsumed the functions described in relation to transaction id generation unit 502 and transaction id reception unit 606 such that the graphics controller itself now can generate, recognize, and handle transaction ids and their associated data units.

The foregoing detailed description set forth various embodiments of the present invention via the use of block diagrams, pictographic representations, and examples. It will be understood as notorious by those within the art that each component, step, and operation illustrated by the use of block diagrams, pictographic representations, and examples can be implemented, individually and/or collectively, by a wide range of hardware, software, firmware, or any combination thereof. In one embodiment, the present invention is implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this specification.

Other Embodiments

Several various embodiments have been described above, and it will be obvious to those skilled in the art that, based upon the teachings herein, changes and modifications may be made without departing from this invention and its broader aspects. That is, all examples set forth herein are intended to be exemplary and non-limiting.

For example, while the foregoing described embodiments have logically associated transaction ids with read requests and data via the use of three lines of the SBA bus and the ST[2::0] bus, it will be appreciated that the selection of these lines is a design choice and that the functions described related to the logical association of the transaction ids with the read requests and data may be embodied via a number of different ways, one of which would be to utilize other AGP interface standard data lines for such associating within the design constraints of a particular system. Accordingly, the herein described architectures are not intended to be limiting. Also for example, while the transaction ids have been described as being of 3 bits in length, it will be appreciated that transaction ids of other lengths can be used to implement the device. Accordingly, the herein described messaging lengths are not intended to be limiting.

Also for example, while the embodiments have been described in the context of the AGP interface standard, it will be recognized that the embodiments herein can be applied to other similar problems which exist in other non-AGP interface standard systems wherein similar problems analogous to those solved by the present invention exist. For example, systems wherein pipelining is utilized but where no mechanisms exist which allow the pipelined transactions to be identified. Thus, the herein described specific protocols are not intended to be limiting.

Also, for example, while the embodiments described herein have contemplated that a transaction id would be generated and associated by a graphics controller, it is also contemplated that a graphics controller could send the request without the transaction id, and that the Northbridge would instead affix the transaction id in response to the order in which requests were received by the Northbridge. Thereafter, it is envisioned that the graphics controller would "remember" the order in which the data requests were transmitted and consequently would reorder the data units received on the basis of the associated transaction id and such remembering Thus, the herein described location of functional units are not intended to be limiting.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is, to be understood that the invention is solely defined by the appended claims.

What is claimed is:

1. A device, comprising:
    a memory controller configured to access a system memory to obtain data in response to a plurality of Advanced Graphics Port (AGP) pipelined read requests;
    an AGP interface configured to provide an interface to an AGP bus and to receive the plurality of AGP pipelined read requests from a requesting AGP device in a first order and return a data response to the requesting AGP device for each of the plurality of AGP pipelined read requests in a second order different from the first order, wherein each said data response comprises the data obtained by the memory controller from the system memory for the corresponding AGP pipelined read request; and
    a transaction ID unit configured to associate a transaction ID with each said data response, wherein the transaction ID for each said data response is returned to the requesting AGP device.

2. The device as recited in claim 1, further comprising buffers configured to store the AGP pipelined read requests paired with their corresponding transaction IDs while the AGP pipelined read requests are pending.

3. The device as recited in claim 1, wherein the AGP interface is further configured to receive a transaction ID from the requesting AGP device for each of the plurality of AGP pipelined read requests.

4. The device as recited in claim 3, further comprising a transaction ID buffer, and wherein the AGP interface is further configured to store the received transaction IDs in the transaction ID buffer, wherein each said received transaction ID is paired with its corresponding AGP pipelined read request.

5. The device as recited in claim 3, wherein the AGP interface is configured to receive the transaction IDs from the requesting AGP device on a Side Band Addressing bus portion of the AGP bus.

6. The device as recited in claim 5, wherein the AGP interface is further configured to receive each said transaction ID on the Side Band Addressing bus portion after receiving an address for the corresponding AGP pipelined read request on the Side Band Addressing bus portion.

7. The device as recited in claim 1, wherein the memory controller is configured to access the system memory in response to the plurality of AGP pipelined read requests in a different order than said first order.

8. The device as recited in claim 1, wherein the AGP interface is configured to return to the requesting AGP device the transaction ID for each said data response on a different portion of the AGP bus than the data response.

9. The device as recited in claim 8, wherein the different portion of the AGP bus on which the transaction ID for each said data response is returned is an AGP ST[2::0] bus portion.

10. The device as recited in claim 1, further comprising a CPU bus interface configured to interface a CPU to the AGP interface for accessing the AGP bus and to the memory controller for accessing the system memory.

11. The device as recited in claim 10, further comprising a Peripheral Component Interconnect (PCI) interface configured to interface a PCI bus to the memory controller and CPU interface.

12. A computer system, comprising:
a system memory;
an Advanced Graphics Port (AGP) device coupled to an AGP bus; and
a northbridge coupled to the system memory and the AGP bus, the northbridge comprising a memory controller configured to access the system memory to obtain data in response to a plurality of Advanced Graphics Port (AGP) pipelined read requests;
wherein the northbridge is configured to receive the plurality of AGP pipelined read requests from the AGP device in a first order and return a data response to the requesting AGP device for each of the plurality of AGP pipelined read requests in a second order different from the first order, wherein each said data response comprises the data obtained by the memory controller from the system memory for the corresponding AGP pipelined read request; and
wherein the northbridge is further configured to associate a transaction ID with each said data response, wherein the transaction ID for each said data response is returned to the requesting AGP device.

13. The computer system as recited in claim 12, wherein the northbridge comprises buffers configured to store the AGP pipelined read requests paired with their corresponding transaction IDs while the AGP pipelined read requests are pending.

14. The computer system as recited in claim 12, wherein the northbridge, is further configured to receive a transaction ID from the AGP device for each of the plurality of AGP pipelined read requests.

15. The computer system as recited in claim 14, wherein the northbridge comprises a transaction ID buffer, and wherein the northbridge is further configured to store the received transaction IDs in the transaction ID buffer, wherein each said received transaction ID is paired with its corresponding AGP pipelined read request.

16. The computer system as recited in claim 14, wherein the northbridge is configured to receive the transaction IDs from the AGP device on a Side Band Addressing bus portion of the AGP bus.

17. The computer system as recited in claim 16, wherein the northbridge is further configured to receive each said transaction ID on the Side Band Addressing bus portion after receiving an address for the corresponding AGP pipelined read request on the Side Band Addressing bus portion.

18. The computer system as recited in claim 12, wherein the memory controller is configured to access the system memory in response to the plurality of AGP pipelined read requests in a different order than said first order.

19. The computer system as recited in claim 12, wherein the northbridge is configured to return to the requesting AGP device the transaction ID for each said data response on a different portion of the AGP bus than the data response.

20. The computer system as recited in claim 19, wherein the different portion of the AGP bus on which the transaction ID for each said data response is returned is an AGP ST[2::0] bus portion.

21. The computer system as recited in claim 12, further comprising:
a CPU coupled to the northbridge;
wherein the northbridge is configured to interface the CPU to the AGP bus and to the memory controller for accessing the system memory.

22. The computer system as recited in claim 21, further comprising:
a Peripheral Component Interconnect (PCI) bus;
wherein the northbridge is configured to interface the PCI bus to the memory controller and the CPU.

23. The computer system as recited in claim 12, wherein the AGP device comprises a graphics controller, wherein the graphics controller comprises a transaction ID generation unit configured to provide the transaction ID for each of the AGP pipelined read requests sent from the graphics controller.

24. The computer system as recited in claim 23, wherein the transaction ID generation unit is configured to send the transaction IDs from the AGP device on a Side Band Addressing bus portion of the AGP bus.

25. The computer system as recited in claim 24, wherein the transaction ID generation unit is further configured to send each said transaction ID on the Side Band Addressing bus portion after an address is sent for the corresponding AGP pipelined read request on the Side Band Addressing bus portion.

26. The computer system as recited in claim 12, wherein the AGP device comprises:
a graphics processor; and
a transaction ID reception unit configured to receive the transaction ID for each said data response, wherein the transaction ID reception unit is further configured to reorder the data responses so that the data responses are returned to the graphics processor in the same order that the AGP pipelined read requests were sent from the AGP device.

27. A method, comprising:

receiving a plurality of Advanced Graphics Port (AGP) pipelined read requests from a requesting AGP device in a first order;

generating a data response for each of the AGP pipelined read requests;

associating a transaction ID with each said data response; and returning each said data response and associated transaction ID to the requesting in a second order different from the first order.

28. The method as recited in claim 27, further comprising receiving a transaction ID from the requesting AGP device for each of the plurality of AGP pipelined read requests.

29. The method as recited in claim 28, further comprising buffering the received transaction IDs paired with its corresponding AGP pipelined read request while the AGP pipelined read requests are pending.

30. The method as recited in claim 28, wherein said receiving a transaction ID comprises receiving the transaction IDs from the requesting ASP device on a Side Band Addressing bus portion of the AGP bus.

31. The method as recited in claim 30, further comprising receiving an address for the corresponding AGP pipelined read request on the Side Band Addressing bus portion.

32. The method as recited in claim 27, wherein said generating a data response comprises accessing a system memory in response to the plurality of AGP pipelined read requests in a different order than said first order.

33. The method as recited in claim 32, wherein said accessing a system memory in response to the plurality of AGP pipelined read requests comprises accessing the system memory in a different order than said first order.

34. The method as recited in claim 27, wherein said returning each said data response and associated transaction ID comprises returning to the requesting AGP device the transaction ID for each said data response on a different portion of the AGP bus than the data response.

35. The method as recited in claim 34, wherein the different portion of the AGP bus on which the transaction ID for each said data response is returned is an AGP ST[2::0] bus portion.

* * * * *